US011912249B2

(12) United States Patent
Bedel

(10) Patent No.: US 11,912,249 B2
(45) Date of Patent: Feb. 27, 2024

(54) POWERED JACKING MECHANISM FOR SEMI-TRAILER LANDING GEAR

(71) Applicant: BUILT WITH SKILL, LLC, Greensburg, IN (US)

(72) Inventor: Ambrose Bedel, Greensburg, IN (US)

( * ) Notice: Subject to any disclaimer, the term of this patent is extended or adjusted under 35 U.S.C. 154(b) by 91 days.

(21) Appl. No.: 17/457,190

(22) Filed: Dec. 1, 2021

(65) Prior Publication Data
US 2022/0169211 A1 Jun. 2, 2022

Related U.S. Application Data

(60) Provisional application No. 63/199,019, filed on Dec. 2, 2020.

(51) Int. Cl.
*B60S 9/08* (2006.01)

(52) U.S. Cl.
CPC ........... *B60S 9/08* (2013.01); *B60Y 2200/148* (2013.01)

(58) Field of Classification Search
CPC .............................. B60S 9/08; B60Y 2200/148
See application file for complete search history.

(56) References Cited

U.S. PATENT DOCUMENTS

| | | | | |
|---|---|---|---|---|
| 5,538,225 A | * | 7/1996 | VanDenberg | ........... F16H 63/30 254/419 |
| 5,865,499 A | | 2/1999 | Keyser | |
| 5,897,121 A | * | 4/1999 | Case | ........................ B25B 13/48 254/133 R |
| 5,904,342 A | * | 5/1999 | Laarman | .................... B60S 9/08 254/419 |
| 5,911,437 A | * | 6/1999 | Lawrence | ................. B60S 9/04 254/419 |
| 6,010,154 A | * | 1/2000 | Payne | ........................ B60S 9/08 81/176.15 |
| 7,311,332 B2 | * | 12/2007 | Baxter | ...................... B60S 9/08 254/419 |
| 8,590,417 B1 | * | 11/2013 | Bono | ........................ B60S 9/08 254/419 |
| 8,820,714 B2 | | 9/2014 | Shih | |
| 9,242,622 B1 | * | 1/2016 | Sanders | ..................... B60S 9/08 |
| 9,457,773 B2 | * | 10/2016 | Müller | ...................... B60S 9/06 |
| 10,343,654 B2 | * | 7/2019 | Evans | ....................... B66F 3/44 |
| 10,464,193 B2 | * | 11/2019 | Chen | ................... B25B 23/0078 |
| 10,496,123 B1 | * | 12/2019 | Palermo, Jr. | ............ G05G 1/085 |
| 10,556,572 B2 | * | 2/2020 | Sun | ............................ B60S 9/12 |
| 11,009,062 B2 | * | 5/2021 | Hunsaker | .............. F16C 11/045 |
| 11,049,340 B2 | * | 6/2021 | Sun | ............................ B60S 9/08 |
| 11,097,648 B2 | * | 8/2021 | Helline | ................... B25B 17/02 |
| 11,148,645 B2 | * | 10/2021 | Hicks | ...................... H02K 11/28 |
| 11,377,075 B2 | * | 7/2022 | Beik | .......................... B60S 9/06 |

(Continued)

*Primary Examiner* — Jacob B Meyer
(74) *Attorney, Agent, or Firm* — Squire Patent Consulting & IP Law LLC; Brendan E. Squire

(57) ABSTRACT

A powered jacking mechanism for semi-trailer landing gear is disclosed. The mechanism includes a coupling for attachment to an operating rod of a semi-tractor trailer landing gear jack. The coupling includes an idler sleeve for retaining the manual jack handle with the trailer during powered operation of the jack. The coupling includes a modified drive socket for selective coupling with either a drive end of the manual jack handle and a drive bit coupled to a rotary drive unit. In preferred embodiments, the rotary drive unit is a cordless screwdriver.

12 Claims, 7 Drawing Sheets

(56) References Cited

U.S. PATENT DOCUMENTS

| | | | |
|---|---|---|---|
| 2004/0080125 A1* | 4/2004 | Bird .......................... | B60S 9/08 |
| | | | 280/6.153 |
| 2005/0109996 A1 | 5/2005 | Razzaghi | |
| 2007/0256526 A1 | 11/2007 | Razzaghi | |
| 2007/0257243 A1* | 11/2007 | Cofer ..................... | G05G 1/085 |
| | | | 254/419 |
| 2011/0012333 A1* | 1/2011 | Griffin ..................... | B60S 9/08 |
| | | | 280/766.1 |
| 2015/0197127 A1* | 7/2015 | Magestro ................. | B60S 9/18 |
| | | | 173/217 |
| 2017/0001603 A1* | 1/2017 | Chen ................... | B25B 23/0078 |
| 2022/0169211 A1* | 6/2022 | Bedel ....................... | B60S 9/08 |

\* cited by examiner

POWERED JACKING MECHANISM FOR SEMI-TRAILER LANDING GEAR

CROSS-REFERENCE TO RELATED APPLICATION

This application claims the benefit of priority of U.S. provisional application No. 63/199,019 filed Dec. 2, 2020, the contents of which are herein incorporated by reference.

BACKGROUND OF THE INVENTION

The present invention relates jacks for semi-tractor trailers, and more particularly to powered jack operations for the same.

Conventional semi-tractor trailers are equipped with a landing gear that allows the trailer to be parked in a supported position without being connected to the semi-tractor. This landing gear is normally provided with a crank arm to allow an operator to manually crank a jacking mechanism to selective raise and lower the landing gear. This manual operation takes time and significant effort on the part of the operator.

Other powered landing gear jack mechanisms rely on removal of the manual crank arm from the landing gear jack mechanism. Unfortunately, the removal of the manual crank arm can lead to inadvertent loss of the manual crank arm. Likewise, since it is no longer coupled to the landing jacking mechanism, stowage for the manual crank arm must be provided so that the manual crank arm remains with the trailer during transport.

Yet other powered landing gear jack mechanisms rely on significant modification of the landing gear jack mechanism to add mechanical gearboxes, hydraulics, and other components to provide power lifting to the manual jack mechanism.

As can be seen, there is a need for improved apparatus and methods for powered operation of a semi-trailer landing gear jack

SUMMARY OF THE INVENTION

In one aspect of the present invention, an apparatus for manual and powered operation of a jack mechanism of a landing gear for a semi-trailer is disclosed. The apparatus includes a cylindrical shaft configured for coupling with a distal end of an operating rod the jack mechanism of the landing gear of the semi-trailer. A drive post extending from a second end of the cylindrical shaft is configured to selectively engage with each of a cooperating end of a manual crank arm of the jack mechanism and a cooperating end of a hand-held rotary drive unit. An idler sleeve surrounds the cylindrical shaft for rotation of the cylindrical shaft within the idler sleeve.

In some embodiments, a lug extends radially outwardly from the idler sleeve. The lug is adapted to couple with a cooperating end of the manual crank arm.

In some embodiments, a tether having a first end is coupled with the idler sleeve and a second end of the tether is coupled with the manual crank arm proximal to the cooperating end of the manual crank arm.

In some embodiments, when the hand-held rotary drive unit is coupled with the drive post, the cooperating end of the manual crank arm is coupled with the lug.

In some embodiments, the hand-held rotary drive unit is a cordless screwdriver. The cooperating end of the cordless screwdriver may be a drive bit for retention in a chuck of the cordless screwdriver.

In other aspects of the invention, a method of operating a jack mechanism of a landing gear for a semi-trailer is disclosed. The method includes fitting a cylindrical shaft to a distal end of an operating shaft of the landing gear. The operating shaft is rotatable to selectively raise and lower a support foot of the landing gear. A drive end extending from a second end of the cylindrical shaft is configured to selectively engage with each of a cooperating end of a manual crank arm of the jack mechanism and a cooperating end of a hand-held rotary drive unit.

In some embodiments, the method may also include attaching the cooperating end of the manual crank arm with the drive end and operating the manual crank arm to selectively raise or lower the support foot of the landing gear.

In some embodiments, the method includes attaching the cooperating end of the hand-held rotary drive unit with the drive end of the cylindrical shaft and operating the hand-held rotary drive unit to selectively raise or lower the support foot of the landing gear.

In some embodiment, the method includes attaching the cooperating end of the manual crank arm to a lug extending from an idler sleeve surrounding the cylindrical shaft for rotation of the cylindrical shaft within the idler sleeve.

In other embodiments, the method includes attaching a first end of a tether to the idler sleeve and a second end of the tether proximal to the cooperating end of the manual crank arm so that the tether is rotationally carried about the manual crank arm.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide apparatus and methods for powered operation of a semi-trailer landing gear jack. A modified jack coupling for the landing gear jack mechanism of a semi-trailer allows the operator to selectively choose between a manual operation of the jack and a powered operation of the landing gear jack mechanism.

Figure 1:
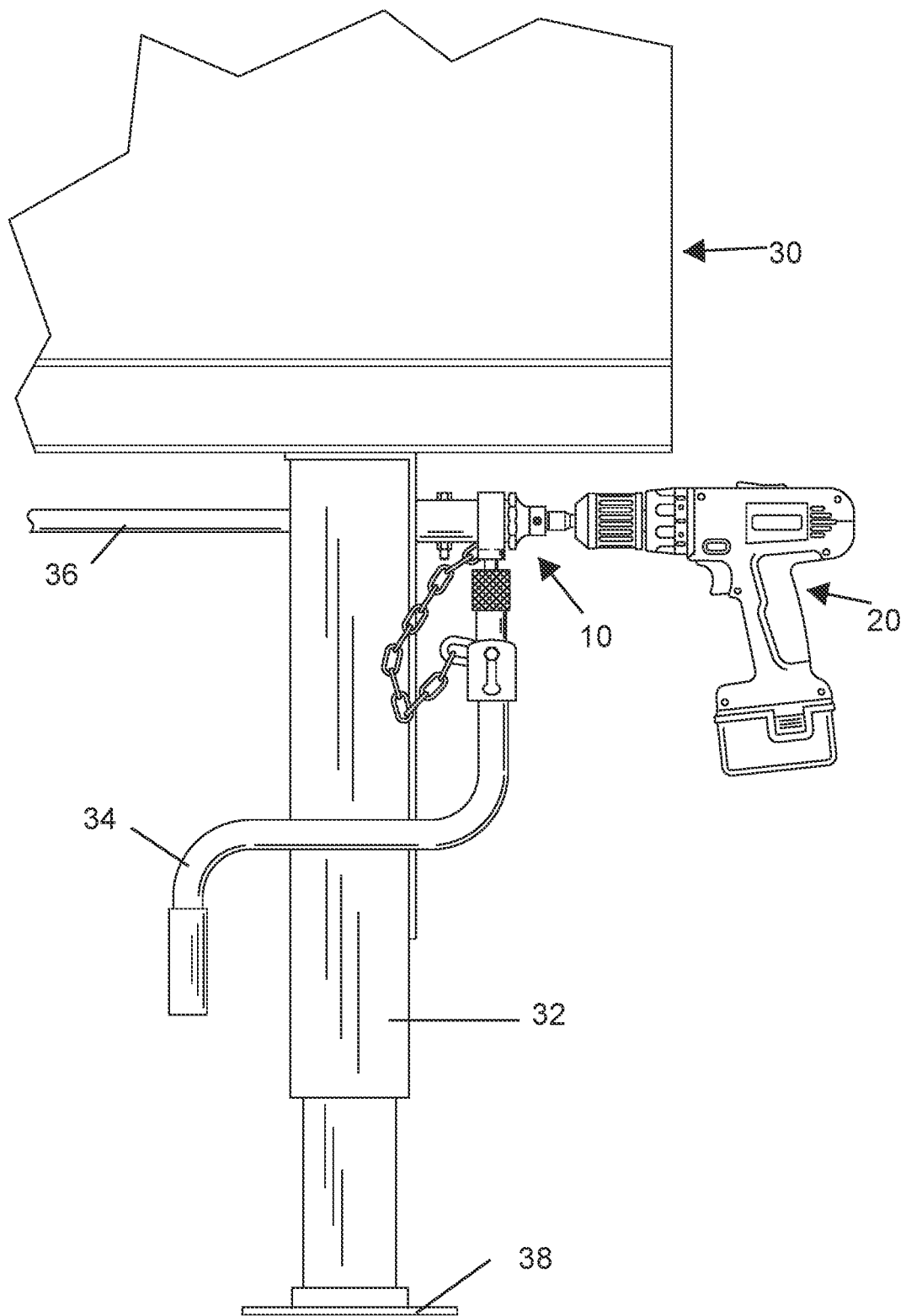
FIG. 1 is a front elevation view of the powered jacking mechanism applied to operate a semi-trailer landing gear.
Figure 2:
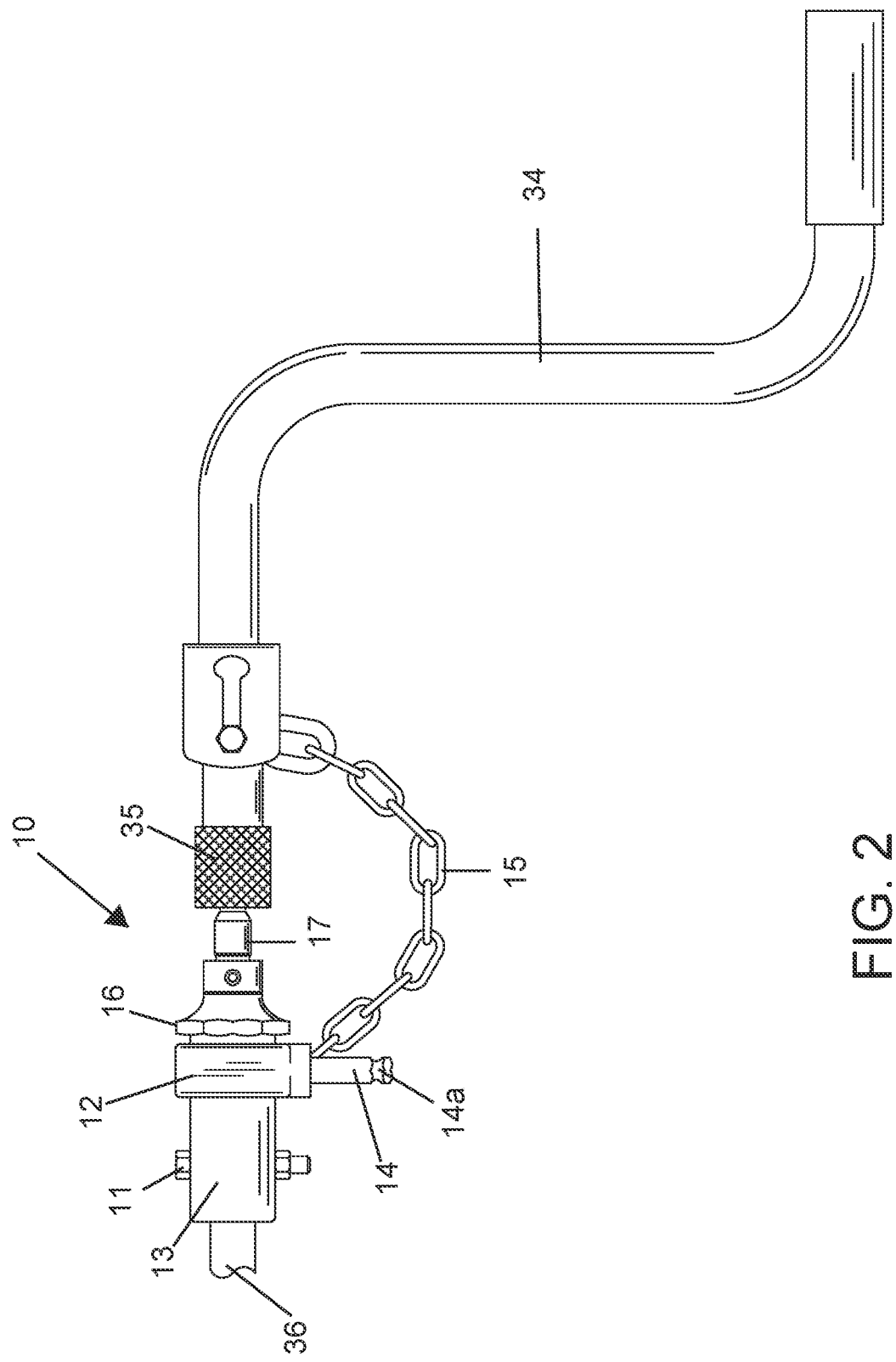
FIG. 2 is a front elevation view of an adapter for the powered jacking mechanism with a manual hand crank coupled to operate the semi-trailer landing gear.
Figure 3:
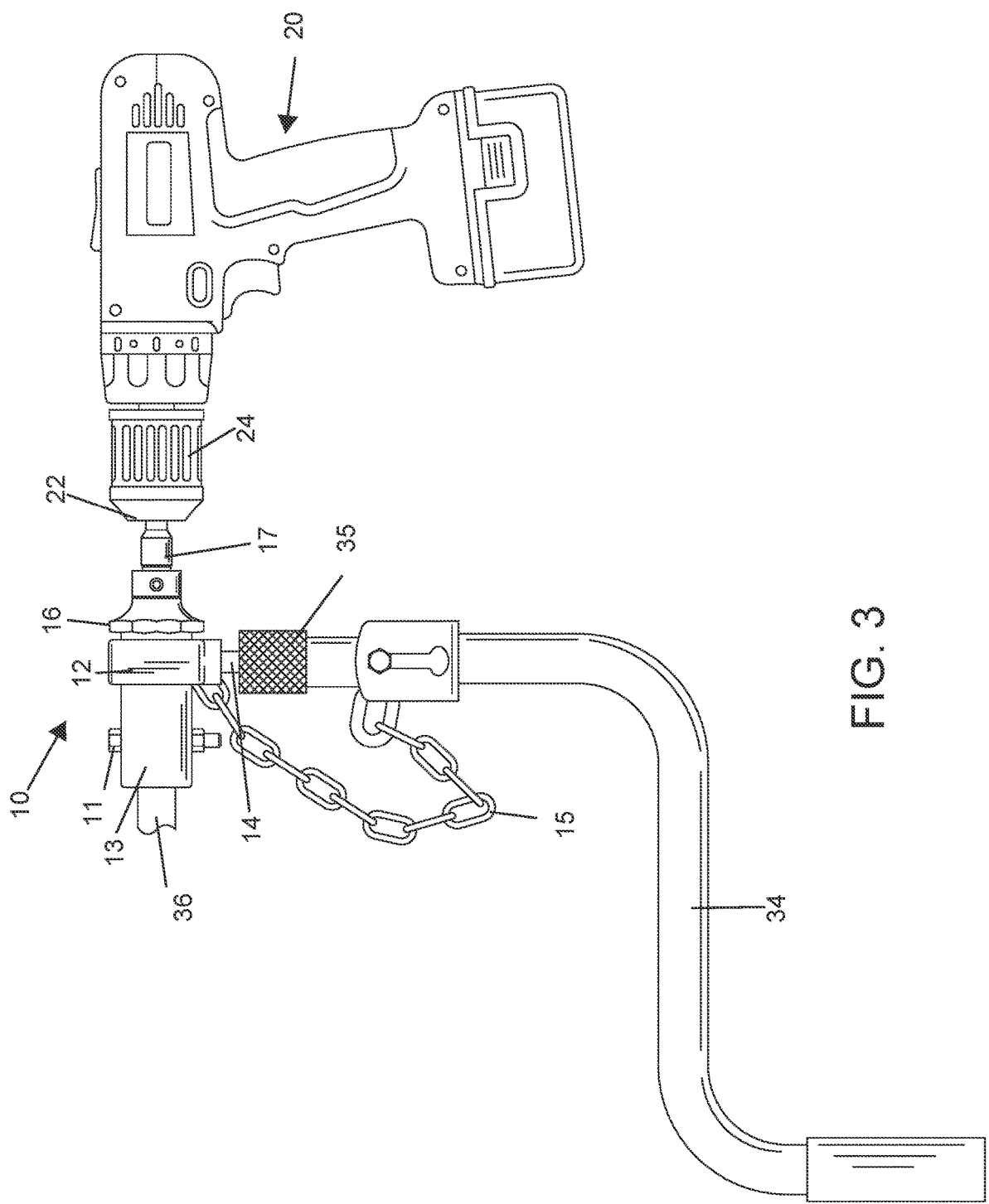
FIG. 3 is an enlarged front elevation view of the adapter coupled with a powered jacking mechanism applied to operate the semi-trailer landing gear.
Figure 4:
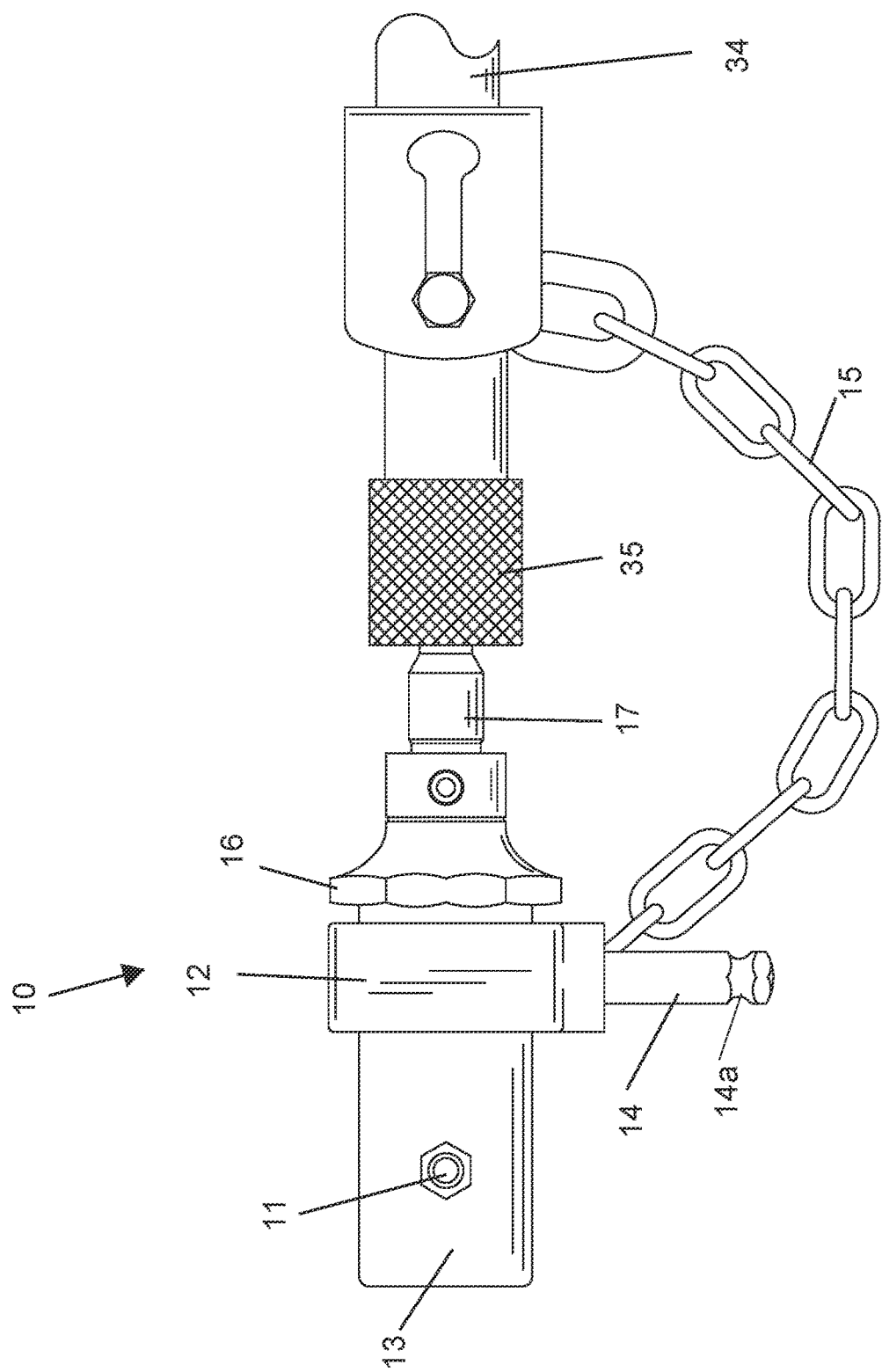
FIG. 4 is a detail front elevation view of the adapter for the powered jacking mechanism with the manual hand crank coupled to operate the semi-trailer landing gear.
Figure 5:
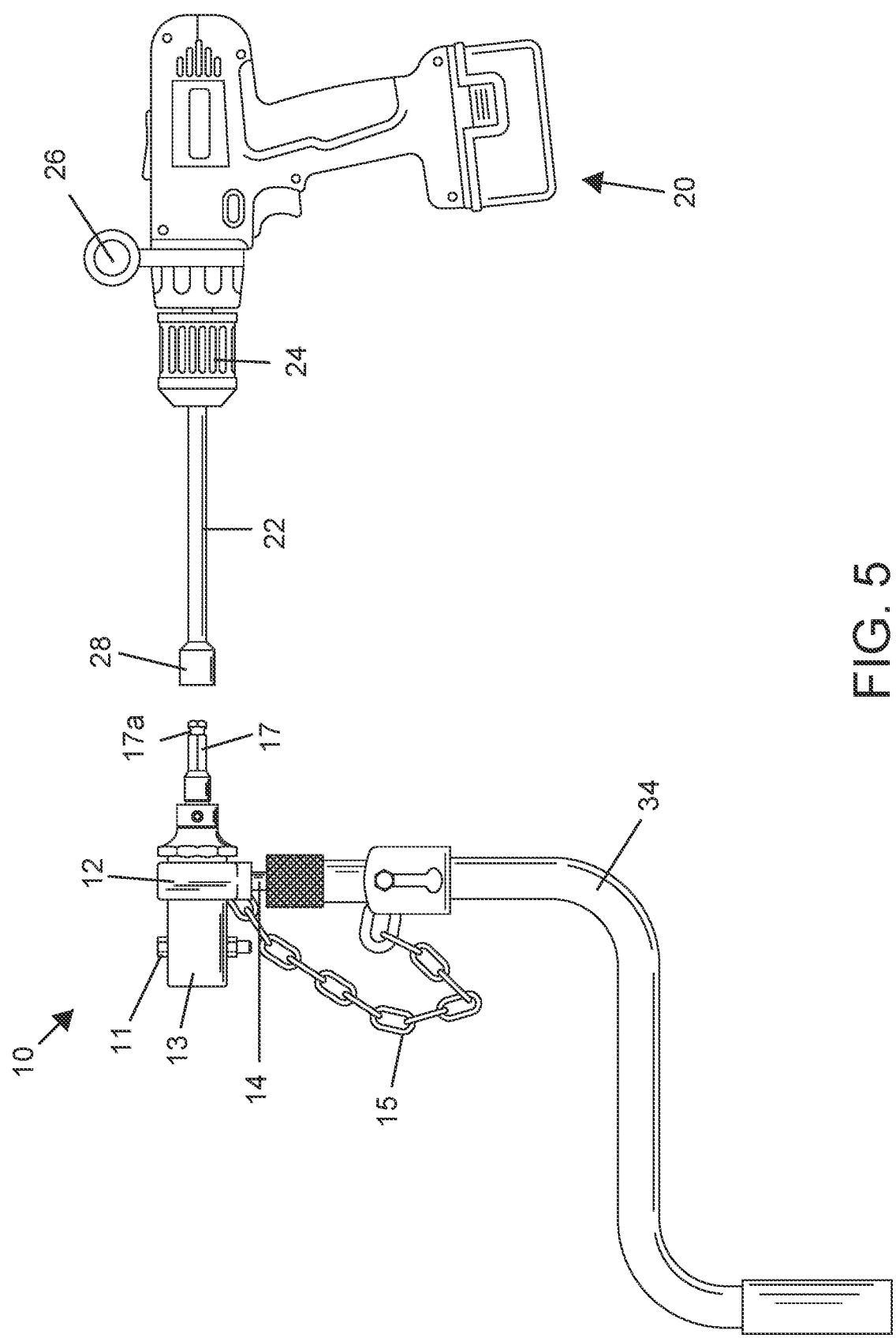
FIG. 5 is a front elevation view of the adapter coupled with a powered jacking mechanism and extension applied to operate the semi-trailer landing gear.
Figure 6:
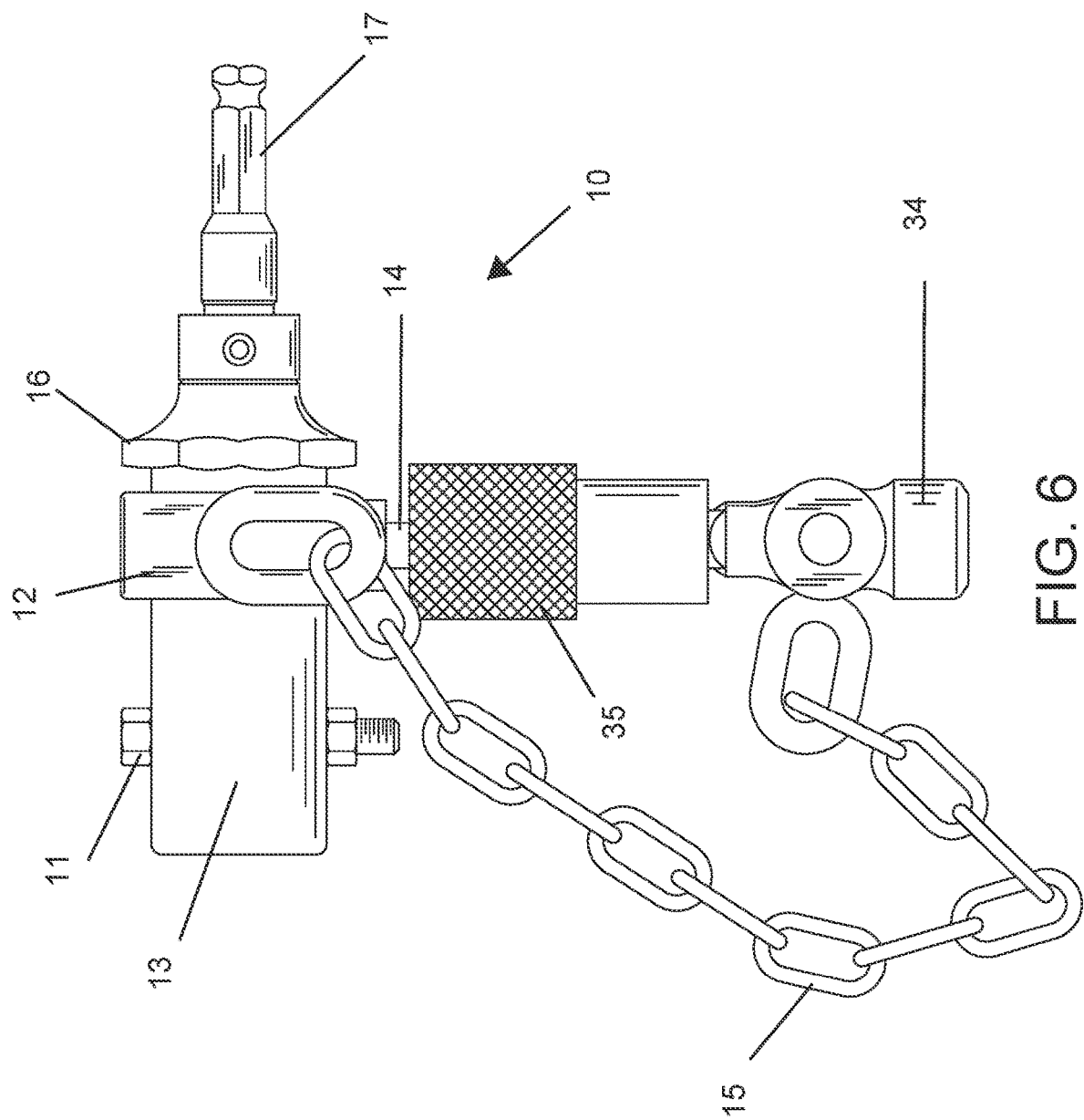
FIG. 6 is a detail front elevation view of the adapter configured for coupling with the powered jacking mechanism.
Figure 7:
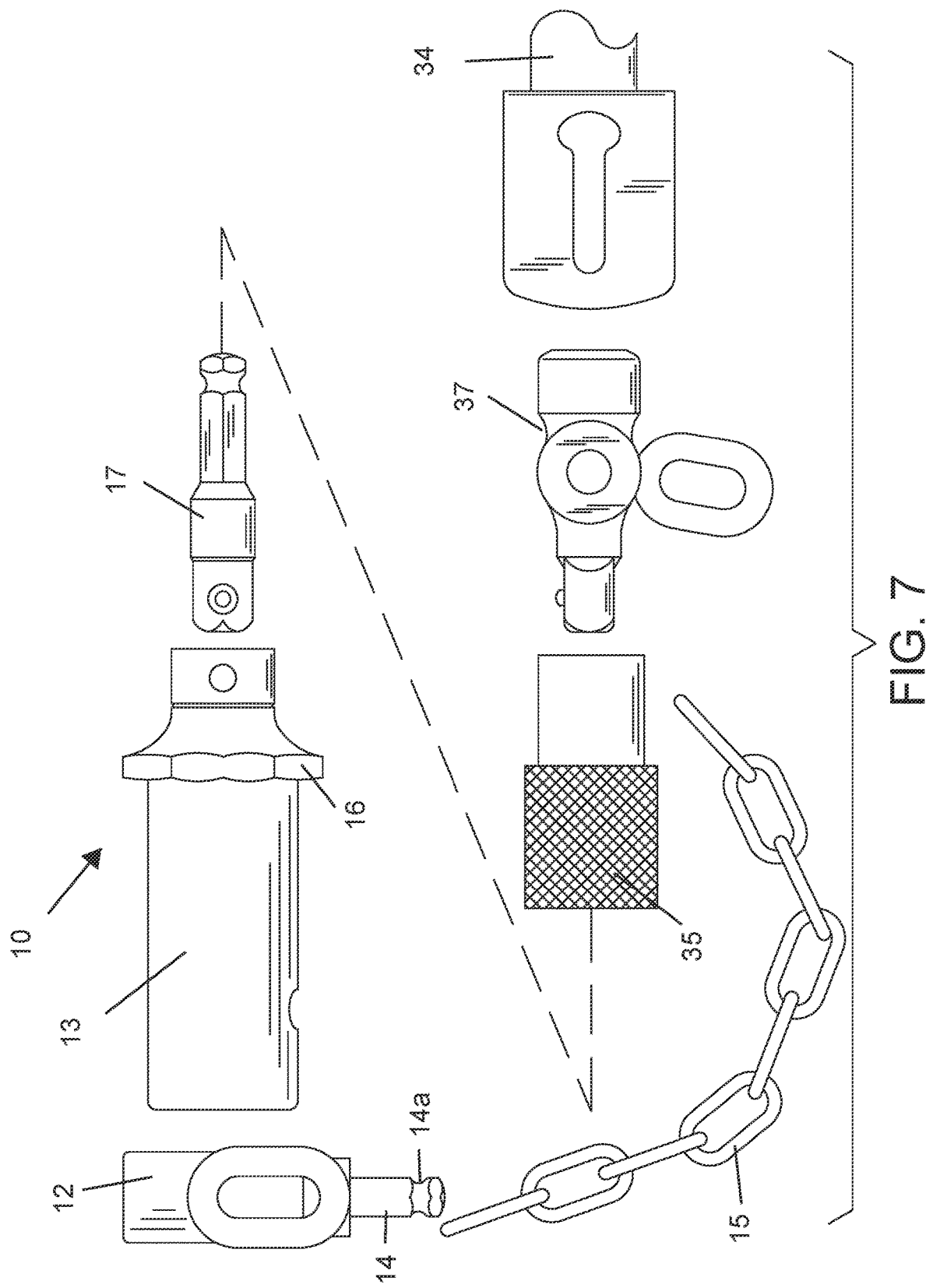
FIG. 7 is an exploded front elevation view of the adapter components.

As seen in reference to the drawings of FIGS. 1-8 aspects of the present invention include a modified coupling 10 for a jack mechanism 32 of a semi-tractor trailer 30. The coupling 10 has a cylindrical shaft 13 at a first end that is fitted on a distal end of an operating rod 36 the landing gear jack mechanism 32, via a fastener 11, such as a pin, a bolt, a screw, a rivet, or a weld. The jack mechanism 32 selectively elevates and lowers a support foot 38. A second end of the coupling 10 is fitted to selectively engage with a manual crank handle 34 of the jack mechanism 32 that is normally coupled to the semi-tractor trailer 30 and a hand-held rotary drive unit 20, such as a cordless drill.

An idler sleeve 12 surrounds the cylindrical shaft 13 of the coupling 10 and permits the cylindrical shaft 13 to rotate within the idler sleeve 12. The idler sleeve 12 has a lug 14 extending radially outwardly that is adapted to couple with a quick disconnect 35 adapted to a distal end of the of the manual crank arm 34, such as via an adapter 37. A tether 15, such as a chain or a cable, has a first end that is coupled to the idler sleeve 12 and a second end that is coupled to the manual crank arm 34 proximal to the quick disconnect 35 to ensure the manual crank arm 34 is retained with the trailer 30 and is not inadvertently lost or separated from the trailer 30. In some embodiments, an adapter 37 may be provided to adapt an end of the manual crank arm 34 with the quick disconnect 35. While shown as discrete components, the quick disconnect 35 and the adapter 37 may be combined as a unitary component to adapt the manual crank arm 34 for releasable interconnection with a drive connection 17 of the coupling 10.

A pawl or ball bearings of the quick disconnect 35 couple with a recess 14a of the lug 14 for releasable coupling of the quick disconnect 35 with the lug. Likewise, the pawl or bearings of the quick disconnect 35 couple with a recess 17a at a distal end of the drive connection 17. In the case of the drive connection 17, the quick disconnect 35 coupling allows the operator to take advantage of a variable elevation gearbox incorporated with the landing gear 32 on the trailer 30. By way of example, pressing inwardly along a longitudinal axis of the operating rod 36 may engage a high rate of elevation/lowering in the gearbox for a faster movement of the landing gear 32, typically in an unloaded condition. Conversely, pulling outwardly along the longitudinal axis of the operating rod 36 may engage a low rate of elevation/lowering in the gearbox for a slower movement of the landing gear 32, typically in a loaded condition. The quick disconnect 35 is particularly useful for the latter, permitting retention of the hand-held rotary drive unit 20 with the coupling 10.

When the coupling 10 is configured for powered operation of the jack mechanism 32, the quick disconnect 35 of the manual crank arm 34 is coupled to the lug 14. During rotation of the landing gear operating rod 32, the manual crank arm 34, carried on the lug 14 of the idler sleeve 12, remains suspended from the lug 14, and remains stationary. A retaining lip 16 may be provided at the outer end of the coupler 10 to retain the idler sleeve 12 on the cylindrical shaft 13.

A drive connection 17, such as post or a socket, is provided at an outer end of the coupling 10. The drive connection 17 is configured to receive a quick disconnect 35 of the manual crank arm 34 and a drive bit 22 for the rotary power unit 20. In a non-limiting example, the drive connection 17 and drive bit 22 may be that of a conventional square end or hexagonal end ratchet wrench coupling with a pawl, or ball, to engage the drive connection 17 and the drive bit 22.

As indicated, the rotary power unit 20 may be a cordless screwdriver. The drive bit 22 coupling with the cordless screwdriver 20 will typically have a shank for engagement with a chuck 24 of the cordless screwdriver 20. The drive end 28 of the drive bit 22 has a head 28 that may be engaged with the drive connection 17 of the coupling 10. The hand-held rotary drive unit 20 is equipped with a reversing mechanism to permit rotation of the drive bit 22 in one of a clockwise or counterclockwise direction to raise or lower the landing gear 32 by rotational operation of the operating shaft 36 of the landing gear jack 32.

Preferably, the hand-held rotary drive unit 20 is provided with a clutch mechanism that prevents the hand-held rotary drive unit 20 from an over torque of the user's hands while operating the jack mechanism 32. An extension arm 26 may also be provided to the hand-held rotary drive unit 20 to provide the operator additional leveraged while holding the hand-held rotary drive unit 20 to counteract the rotational torque of the hand-held rotary drive unit 20 during operation of the jack mechanism 32.

It should be understood, of course, that the foregoing relates to exemplary embodiments of the invention and that modifications may be made without departing from the spirit and scope of the invention as set forth in the following claims.

I claim:

1. An apparatus for manual and powered operation of a jack mechanism of a landing gear for a semi-trailer, comprising:
   a cylindrical shaft having a first end configured for coupling with a distal end of an operating rod of the jack mechanism of the landing gear of the semi-trailer; and
   a drive connection removably coupled to and extending from a second end of the cylindrical shaft, the drive connection having a distal end configured to selectively engage with each of a cooperating coupling of a manual crank arm of the jack mechanism and a cooperating coupling of a hand-held rotary drive unit.

2. The apparatus of claim 1, further comprising:
   an idler sleeve surrounds the cylindrical shaft for rotation of the cylindrical shaft within the idler sleeve; and
   a lug extending radially outwardly from the idler sleeve is adapted to removably couple with the cooperating coupling of the manual crank arm.

3. The apparatus of claim 2, further comprising:
   a tether having a first end coupled to the idler sleeve and a second end of the tether coupled with the manual crank arm proximal to the cooperating end of the manual crank arm.

4. The apparatus of claim 3, wherein when the hand-held rotary drive unit is coupled with the drive connection, and the cooperating end of the manual crank arm is coupled with the lug.

5. The apparatus of claim 1, wherein the hand-held rotary drive unit is a cordless screwdriver.

6. The apparatus of claim 5, wherein the cooperating end of the cordless screwdriver is a drive bit having a shank for retention in a chuck of the cordless screwdriver and a head for cooperative engagement with the drive connection.

7. A method of operating a jack mechanism of a landing gear for a semi-trailer, comprising:

fitting a cylindrical shaft to a distal end of an operating shaft of the landing gear, the operating shaft rotatable to selectively raise and lower a support foot of the landing gear;

removably coupling a drive connection with a second end of the cylindrical shaft, the drive connection having a distal end configured to selectively engage with each of a cooperating end of a manual crank arm of the jack mechanism and a cooperating end of a hand-held rotary drive unit.

8. The method of claim 7, further comprising:

attaching the cooperating end of the manual crank arm with the drive connection; and operating the manual crank arm to selectively raise or lower the support foot of the landing gear.

9. The method of claim 7, further comprising:

attaching the cooperating end of the hand-held rotary drive unit with the drive connection of the cylindrical shaft; and operating the hand-held rotary drive unit to selectively raise or lower the support foot of the landing gear.

10. The method of claim 9, further comprising:

attaching the cooperating end of the manual crank arm to a lug extending from an idler sleeve surrounding the cylindrical shaft for rotation of the cylindrical shaft within the idler sleeve.

11. The method of claim 10, further comprising:

attaching a first end of a tether to the idler sleeve and a second end of the tether proximal to the cooperating end of the manual crank arm so that the tether is rotationally carried about the manual crank arm.

12. An apparatus for manual and powered operation of a jack mechanism of a landing gear for a semi-trailer, comprising:

a cylindrical shaft having a first end configured for coupling with a distal end of an operating rod of the jack mechanism of the landing gear of the semi-trailer;

a drive connection having a ratchet drive head at a first end and a shank at a second end, the ratchet drive head adapted to be removably received in and rotationally drive a second end of the cylindrical shaft, and a recess defined at a distal end of the drive connection;

a quick disconnect coupler connected with an end of a manual crank arm of the jack mechanism, the quick disconnect coupler adapted for releasable coupling with the recess at the distal end of the shank;

an idler sleeve surrounding the cylindrical shaft for rotation of the cylindrical shaft within the idler sleeve; and a lug extending radially outwardly from the idler sleeve, a recess defined at a distal end of the lug adapted to removably couple with the quick disconnect of the manual crank arm.

\* \* \* \* \*